United States Patent
Rich et al.

(10) Patent No.: US 9,139,214 B2
(45) Date of Patent: Sep. 22, 2015

(54) ADJUSTABLE LIFT TRUCK

(75) Inventors: Steve Rich, Perkiomenville, PA (US); Paul Spencer, New Hope, PA (US); Jeff Carson Jarrell, Quakertown, PA (US); Ronald David Melvin, Perkasie, PA (US); Rob Levins, East Norriton, PA (US)

(73) Assignee: Wesco Industrial Products, Inc., Lansdale, PA (US)

( * ) Notice: Subject to any disclaimer, the term of this patent is extended or adjusted under 35 U.S.C. 154(b) by 939 days.

(21) Appl. No.: 13/324,318

(22) Filed: Dec. 13, 2011

(65) Prior Publication Data

US 2012/0145978 A1    Jun. 14, 2012

Related U.S. Application Data

(60) Provisional application No. 61/459,462, filed on Dec. 13, 2010.

(51) Int. Cl.
| | |
|---|---|
| *B62B 3/00* | (2006.01) |
| *B62B 5/00* | (2006.01) |
| *B62B 3/06* | (2006.01) |

(52) U.S. Cl.
CPC ............ *B62B 5/0003* (2013.01); *B62B 3/0606* (2013.01); *B62B 3/0637* (2013.01); *B62B 3/0643* (2013.01); *B62B 2203/10* (2013.01); *B62B 2301/10* (2013.01)

(58) Field of Classification Search
CPC ............ B66F 11/11; B66F 1/00; B66D 1/00; B62B 3/0606
USPC ............... 254/2 R, 2 B, 2 C; 269/17, 32, 228; 414/444, 490, 618; 24/457; 187/206, 187/207, 208, 210, 211, 220, 35, 360, 363, 187/365, 379, 394; 294/198
See application file for complete search history.

(56) References Cited

U.S. PATENT DOCUMENTS

| | | | |
|---|---|---|---|
| 627,284 A | 6/1899 | Walker | |
| 1,424,819 A * | 8/1922 | Hayes et al. | .................. 414/452 |
| 1,484,864 A | 2/1924 | Bompart | |

(Continued)

FOREIGN PATENT DOCUMENTS

| | | |
|---|---|---|
| DE | 29714225 U1 | 10/1997 |
| JP | 04-011558 A | 1/1992 |

OTHER PUBLICATIONS

Escalera Inc., home page, http://www.escalera.com/index.htm; 2 pages (Feb. 13, 2006). cited by other.

(Continued)

*Primary Examiner* — Lee D Wilson
*Assistant Examiner* — Mahdi H Nejad
(74) *Attorney, Agent, or Firm* — Panitch Schwarze Belisario & Nadel LLP

(57) ABSTRACT

An adjustable lift truck having a frame with a first end and an opposing second end. The frame defines a longitudinal axis that extends from the first end to the second end. A pair of transport wheels are rotatably mounted to the frame proximate the first end. A pair of laterally spaced-apart outriggers extend generally perpendicularly to the longitudinal axis of the frame. Each outrigger is located proximate the first end of the frame, and includes a first end pivotally attached to the frame and an opposing free second end.

15 Claims, 9 Drawing Sheets

(56) References Cited

U.S. PATENT DOCUMENTS

| | | | | |
|---|---|---|---|---|
| 1,716,611 | A | 6/1929 | Wilson | |
| 2,598,168 | A | 5/1952 | Hooz et al. | |
| 2,605,117 | A | 7/1952 | Hooz et al. | |
| 2,606,770 | A | 8/1952 | Reichert | |
| 2,917,120 | A | 12/1959 | Gates et al. | |
| 2,956,643 | A * | 10/1960 | Halstead | 248/407 |
| 3,008,463 | A | 11/1961 | Frank | |
| 3,043,603 | A | 7/1962 | Major, Sr. | |
| 3,061,323 | A | 10/1962 | Tittes | |
| 3,064,989 | A | 11/1962 | Bellows | |
| 3,121,963 | A | 2/1964 | Nolan | |
| 3,149,688 | A | 9/1964 | Russell | |
| 3,241,852 | A | 3/1966 | Muller et al. | |
| 3,288,234 | A | 11/1966 | Feliz | |
| 3,330,370 | A | 7/1967 | Morton | |
| 3,362,496 | A | 1/1968 | Landry | |
| 3,362,725 | A | 1/1968 | Dolphin | |
| 3,399,921 | A * | 9/1968 | Trost et al. | 410/69 |
| 3,494,440 | A | 2/1970 | Hanson | |
| 3,515,401 | A | 6/1970 | Gross | |
| 3,604,745 | A * | 9/1971 | Sinclair | 294/197 |
| 3,647,238 | A | 3/1972 | Mackey | |
| 3,713,501 | A | 1/1973 | Hurt | |
| 3,734,518 | A | 5/1973 | Sawmiller et al. | |
| 3,785,669 | A | 1/1974 | Doheny | |
| 3,827,707 | A | 8/1974 | Bierman | |
| 3,850,441 | A | 11/1974 | Peters et al. | |
| 3,873,118 | A | 3/1975 | Takagi | |
| 3,896,904 | A * | 7/1975 | Walker | 187/231 |
| 3,907,138 | A | 9/1975 | Rhodes | |
| 3,912,251 | A * | 10/1975 | Fraser et al. | 269/228 |
| 3,960,252 | A | 6/1976 | Cassimally | |
| 4,009,891 | A | 3/1977 | Jensen | |
| 4,109,740 | A | 8/1978 | Andruchiw | |
| 4,185,853 | A | 1/1980 | Thurmond, Jr. | |
| 4,284,286 | A | 8/1981 | Lewallen | |
| 4,335,895 | A | 6/1982 | Walker | |
| 4,401,319 | A | 8/1983 | Kazmark | |
| 4,448,434 | A | 5/1984 | Anderson | |
| 4,458,785 | A * | 7/1984 | Bushnell, Jr. | 187/231 |
| 4,523,773 | A | 6/1985 | Holtz | |
| 4,563,014 | A | 1/1986 | Mortenson | |
| 4,565,382 | A | 1/1986 | Sherman | |
| 4,637,626 | A | 1/1987 | Foss et al. | |
| 4,679,660 | A * | 7/1987 | Suzuki | 187/219 |
| 4,715,477 | A * | 12/1987 | Suzuki | 187/210 |
| 4,754,985 | A | 7/1988 | Im et al. | |
| 4,825,977 | A * | 5/1989 | Isogai | 187/206 |
| 4,960,179 | A | 10/1990 | Leach | |
| 4,974,862 | A | 12/1990 | Maupin | |
| 4,976,336 | A * | 12/1990 | Curran | 187/208 |
| 4,987,976 | A * | 1/1991 | Daugherty | 187/243 |
| 4,993,727 | A | 2/1991 | vom Braucke et al. | |
| 5,009,287 | A * | 4/1991 | Starr | 187/213 |
| 5,024,458 | A | 6/1991 | Kazmark et al. | |
| 5,036,929 | A | 8/1991 | Trougouboff | |
| 5,111,907 | A * | 5/1992 | Kishi | 182/69.4 |
| D328,661 | S | 8/1992 | vom Braucke et al. | |
| 5,160,153 | A | 11/1992 | Zan | |
| 5,195,762 | A | 3/1993 | Pressly | |
| 5,244,221 | A | 9/1993 | Ward | |
| 5,253,881 | A * | 10/1993 | Dunkle | 280/5.22 |
| 5,277,439 | A | 1/1994 | Pipes et al. | |
| 5,303,968 | A * | 4/1994 | Trine | 294/106 |
| 5,306,027 | A | 4/1994 | Cheng | |
| 5,366,338 | A * | 11/1994 | Mortensen | 414/563 |
| 5,439,239 | A | 8/1995 | Su | |
| 5,452,908 | A | 9/1995 | Bencic | |
| 5,501,497 | A * | 3/1996 | Holloway | 294/86.4 |
| 5,536,034 | A | 7/1996 | Miller | |
| 5,642,895 | A | 7/1997 | Wunder | |
| 5,741,169 | A | 4/1998 | Chen | |
| 5,803,206 | A * | 9/1998 | Halstead et al. | 187/208 |
| 5,810,373 | A | 9/1998 | Miranda | |
| 5,911,413 | A * | 6/1999 | Jun | 269/156 |
| 5,954,160 | A * | 9/1999 | Wells et al. | 187/219 |
| 5,957,472 | A | 9/1999 | Borgatti | |
| 5,975,826 | A * | 11/1999 | Scholder | 414/444 |
| 5,984,327 | A | 11/1999 | Hsieh et al. | |
| 6,095,531 | A | 8/2000 | Khachatoorian | |
| 6,123,162 | A | 9/2000 | Rodriguez et al. | |
| 6,152,462 | A | 11/2000 | Barrett | |
| 6,164,398 | A | 12/2000 | Alber | |
| 6,234,497 | B1 | 5/2001 | Stahler, Sr. | |
| 6,273,438 | B1 | 8/2001 | Prapavat | |
| 6,279,685 | B1 * | 8/2001 | Kogan et al. | 187/208 |
| 6,328,319 | B1 | 12/2001 | Stahler, Sr. | |
| 6,364,328 | B1 | 4/2002 | Stahler, Sr. | |
| 6,474,930 | B1 * | 11/2002 | Simpson | 414/490 |
| 6,619,905 | B2 * | 9/2003 | Stahler | 414/622 |
| 6,814,342 | B1 * | 11/2004 | Perlstein et al. | 254/1 |
| 7,104,166 | B1 * | 9/2006 | Wong | 81/423 |
| 7,137,464 | B2 | 11/2006 | Stahler, Sr. | |
| 7,175,216 | B1 * | 2/2007 | Tong et al. | 294/81.1 |
| 7,837,246 | B2 * | 11/2010 | Gustavsson | 294/81.53 |
| 8,136,803 | B2 * | 3/2012 | McIntosh et al. | 269/32 |
| 8,256,577 | B2 * | 9/2012 | Kritzer | 187/215 |
| 8,651,501 | B1 * | 2/2014 | Davis | 280/47.35 |
| 2009/0314555 | A1 | 12/2009 | Meyers | |

OTHER PUBLICATIONS

Wesco Manufacturing Company; "Master Catalog, 2.sup.nd Edition;" pp. front cover, 21, rear cover; published 1994.

Fred Hill and Son Co,; 1993 Catalog; pp. front cover, 86, 87, 92, rear cover; published 1993.

Harper; Catalog No. 190; pp. front cover, 13, 14, 31, rear cover; published 1990.

Escalera Inc., Stair Climbing Handtrucks and Stair Climbing Forklifts—Stair Climbing—, http://www.escalera.com/stairclimbing/stairclimbingmenu.htm; 1 page (Feb. 13, 2006). cited by other.

Escalera Inc., Stair Climbing Handtrucks and Stair Climbing Forklifts—Models—, http://www.escalera.com/models/models.htm; 2 pages (Feb. 13, 2006). cited by other.

* cited by examiner

ADJUSTABLE LIFT TRUCK

CROSS-REFERENCE TO RELATED APPLICATIONS

The present application claims priority to U.S. Provisional Patent Application No. 61/459,462, entitled "Adjustable Lift Truck" and filed Dec. 13, 2010.

BACKGROUND OF THE INVENTION

The present invention is directed generally to an adjustable lift truck and, more particularly, to a lift hand truck having several features designed for ease of lifting relatively heavy objects and for quick, efficient transport of relatively heavy objects.

Hand trucks are well known to transport various heavy and bulky items, such as barrels or drums filled with liquid or other materials. Conventional hand trucks include a frame for supporting the item and wheels for rolling the frame across a ground surface. In use, the item is placed on the frame and the hand truck is tilted, allowing items to lean against the frame. The wheels enable the hand truck to be pushed and/or pulled to transport the item. Conventional hand trucks perform quite well for transporting relatively light and symmetrically-shaped articles, such as boxes, packing cases and the like. However, it can be difficult and awkward to load and/or unload relatively heavy or oddly-shaped items onto/from the hand truck. Further, it can be difficult to properly position relatively heavy items on the hand truck prior to transporting the item with the hand truck.

Therefore, it would be desirable to create a hand truck or lift truck that is adjustable in size and/or shape to accommodate items of various size and/or shape. More specifically, it would be desirable to create a lift truck that is substantially stable when loading, unloading and transporting relatively heavy items, yet is adjustable to accommodate items of different sizes and/or shapes. Further, it would be desirable to create a lift truck having several features designed to prevent accidents while loading, unloading or transporting relatively heavy items. Finally, it would be desirable to create a lift truck with a structure that aids a user in placing the lift truck on an elevated bed, such as the bed of a pick-up truck, or removing or lowering the lift truck from the bed. The present invention accomplishes these objectives.

BRIEF SUMMARY OF THE INVENTION

Briefly stated, one aspect of the preferred invention is directed to an adjustable lift truck having a frame with a first end and an opposing second end. The frame defines a longitudinal axis that extends from the first end to the second end. A pair of transport wheels are rotatably mounted to the frame proximate the first end. A pair of laterally spaced-apart outriggers extend generally perpendicularly to the longitudinal axis of the frame. Each outrigger is located proximate the first end of the frame, and includes a first end pivotally attached to the frame and an opposing free second end.

In another aspect, the preferred invention is directed to an adjustable lift truck having a frame with a first end and an opposing second end. The frame defines a longitudinal axis that extends from the first end to the second end. A pair of transport wheels are rotatably mounted to the frame proximate the first end. A carriage is movably mounted to the frame along the longitudinal axis thereof. A winch is fixedly attached to the frame and operatively connected to the carriage. Operation of the winch moves the carriage with respect to the frame.

In yet another aspect, the preferred invention is directed to an adjustable lift truck having a frame with a first end and an opposing second end. The frame defines a longitudinal axis that extends from the first end to the second end. A base is fixedly attached to the frame proximate the first end thereof. A pair of laterally spaced-apart transport wheels are mounted to the base. A pair of laterally spaced-apart outriggers extend generally perpendicularly to the longitudinal axis of the frame. Each outrigger is located proximate the first end of the frame, and includes a first end pivotally attached to the frame and an opposing free second end. The free second end of each outrigger includes a support wheel on a lower surface thereof. The pair of outriggers are pivotable between a first position defining a generally ninety degree angle therebetween, a second position defining an angle of less than ninety degrees, and a third position such that the outriggers extend generally parallel to each other. An adjustment lever is pivotally supported by the base and operatively connected to each outrigger. The adjustment lever is pivotable to pivot the outriggers between the first, second and third positions, respectively. A carriage is movably mounted to the frame along the longitudinal axis thereof. A winch is fixedly attached to the frame and operatively connected to the carriage. Operation of the winch moves the carriage with respect to the frame.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which are presently preferred. It should be understood, however, that the invention is not limited to the precise arrangements and instrumentalities shown. In the drawings.

DETAILED DESCRIPTION OF THE INVENTION

Figure 1:
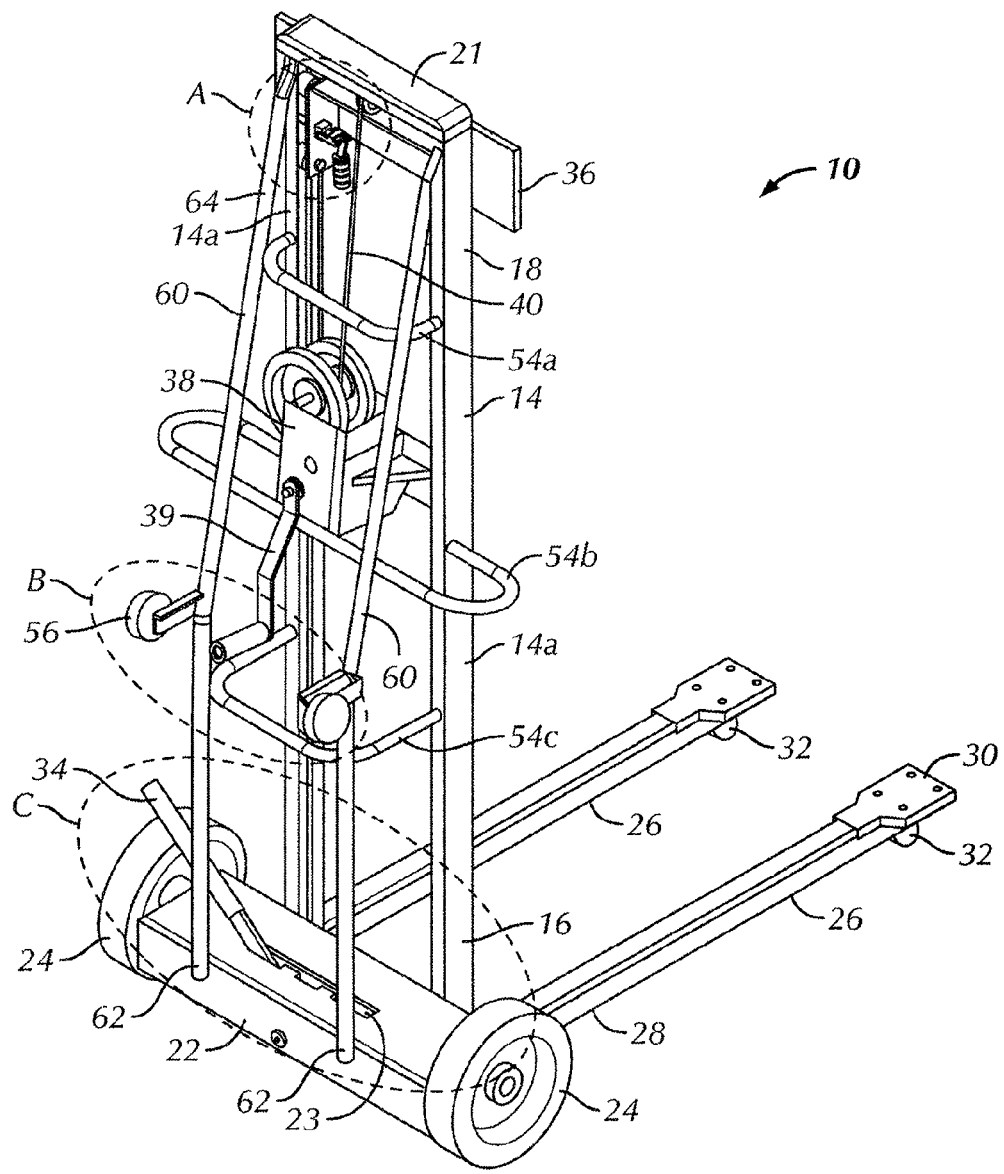
FIG. 1 is a rear perspective view of an adjustable lift truck according to a preferred embodiment of the present invention.

Certain terminology is used in the following description for convenience only and is not limiting. The words "lower" and "upper" designate directions in the drawings to which reference is made. The words "first" and "second" designate an order of operations in the drawings to which reference is made, but do not limit these steps to the exact order described.

The words "inwardly" and "outwardly" refer to directions toward and away from, respectively, the geometric center of the device, and designated parts thereof. Additionally, the term "a," "an," and "the," as used in the specification, mean "at least one." The terminology includes the words above specifically mentioned, derivatives thereof, and words of similar import.

Referring to the drawings in detail, wherein like numerals indicate like elements throughout, there is shown in FIGS. 1-12 an adjustable lifting device or adjustable lift truck ("truck"), generally designated 10, in accordance with a preferred embodiment of the present invention for vertically raising, lowering and/or transporting one or more relatively heavy items or objects, such as a barrel or drum 12 (FIGS. 5-8) filled with liquid or other materials. The truck 10 may also be referred to herein as a hand truck.

Referring to FIGS. 1-12, the truck 10 preferably includes a frame 14 having a first or lower end 16 and an opposing second or upper end 18. The frame 14 is preferably elongated and defines a longitudinal axis 20 (shown in phantom in FIGS. 2 and 3) that extends from the first end 16 to the second end 18 of the frame 14. The frame 14 is preferably formed of two laterally spaced-apart beams or rails 14a that provide structural rigidity to the frame 14. Each beam 14a may be generally planar or rectangular in shape to provide at least one flat surface for attaching additional components of the truck 10 to the frame 14. Each beam 14a is preferably formed of a light-weight, high-strength material, such as a metallic material (steel), however the frame 14 may be formed of any of a variety of materials. As shown in FIG. 1, a top brace 21 is preferably fixedly attached to the second end 18 of the frame 14. More specifically, the top brace 21 preferably connects an upper end portion of each beam 14a of the frame 14.

As shown in FIGS. 1, 1C and 4-11, a base 22 is preferably fixedly attached to the first end 16 of the frame 14. More specifically, the base 22 preferably connects a lower end portion of each beam 14a of the frame 14. In the preferred embodiment, the base 22 is preferably in the shape of a rectangle and generally encloses a cavity (not shown) therein. A slot 23 is preferably located in a top surface of the base 22, as described in further detail below. A pair of laterally spaced-apart transport wheels 24 are rotatably mounted to the frame 14 proximate the first end 16 thereof. More specifically, a transport wheel 24 is preferably rotatably attached to opposing ends or sides of the base 22. In an upright stopped or resting position (FIGS. 1 and 12), the frame 14 preferably extends upwardly away from a ground or other supporting surface 58 (FIG. 12), the base 22 and the transport wheels 24. Alternatively, the frame 14 may be pivoted about an axis that extends generally through the transport wheels 24 and generally perpendicular to the longitudinal axis 20, such that the frame 14 is pivoted to extend generally parallel with the ground or other supporting surface 58.

Figure 12:
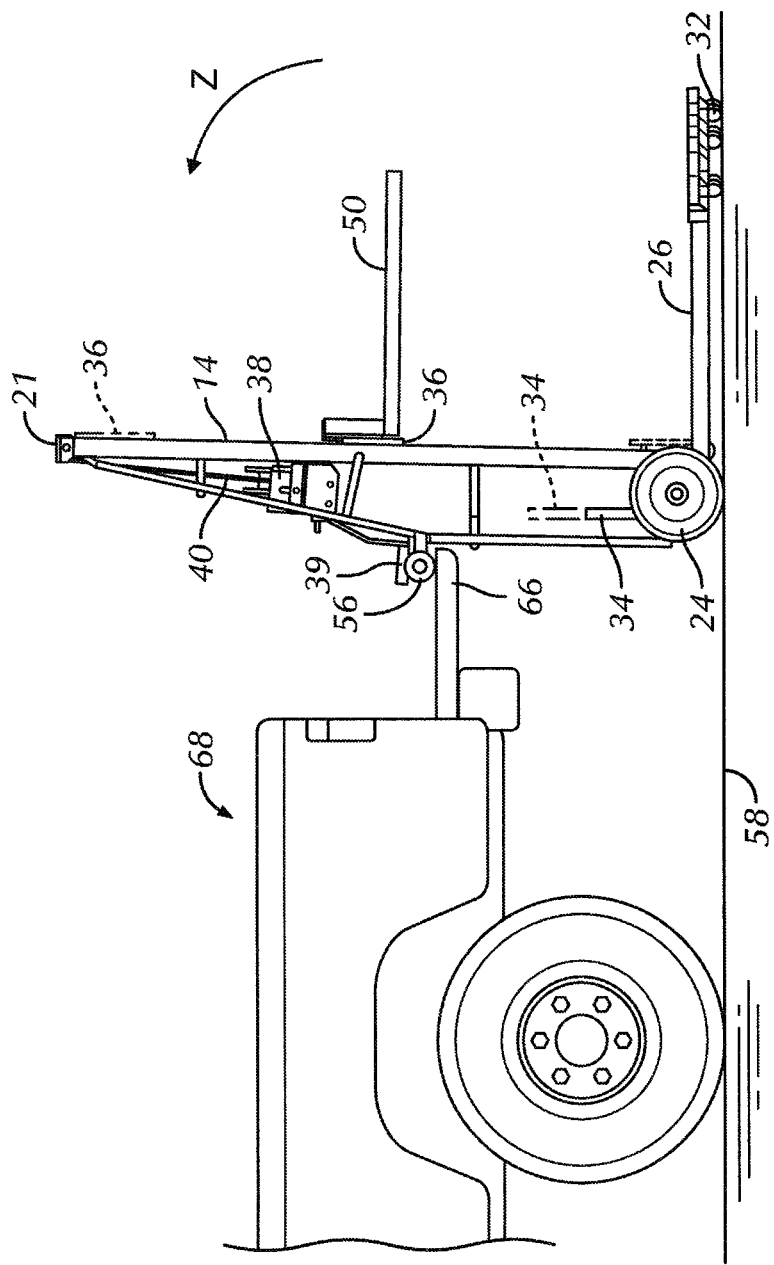
FIG. 12 is a side elevation view of the adjustable lift truck shown in FIG. 1 either prior to being placed onto a bed of a pick-up truck or after being removed from the bed of the pick-up truck.

Referring to FIGS. 1, 1C, 2, 3 and 4-12, the truck 10 preferably includes at least one and preferably a pair of laterally spaced-apart outriggers 26 extending generally perpendicularly to the longitudinal axis 20 of the frame 14. Each outrigger 26 is a generally elongated member that includes a first or inner end 28 pivotally attached to the first or lower end 16 of the frame 14 and/or the base 22 and an opposing second or free end 30. In the upright stopped or resting position (FIGS. 1 and 12) of the truck 10, each outrigger 26 preferably extends generally parallel to the ground surface 58 (FIG. 12). The second end 30 of each outrigger 26 preferably includes a support wheel or caster 32 on a lower surface thereof to aid in movement of the truck 10. Each support wheel 32 may be rotatably around a plurality of axes (i.e., a caster wheel) and preferably has a smaller circumference than each transport wheel 24.

As shown in FIGS. 4, 5, 6 and 7, the pair of outriggers 26 are preferably movable between a first position P1 (FIG. 7) generally defining a ninety degree angle therebetween (i.e., open), a second position P2 (FIG. 5) generally defining an angle of less then ninety degrees therebetween (i.e., mid), and a third position P3 (FIG. 6) such that the outriggers 26 extend generally parallel to one another (i.e., closed). Further, the outriggers 26 are pivotable in a plane that preferably extends generally perpendicular to the longitudinal axis 20 of the frame 14. As described in further detail below, the outriggers 26 are pivotable or adjustable to accommodate different types and/or sizes of loads or items to be raised, lowered and/or moved. For example, in the first position P1, the outriggers 26 can accommodate at least a portion of a corner of a conventional wooden pallet 13 (FIGS. 7 and 8) generally therebetween, so that the truck 10 can approach, engage, raise and/or lower a barrel 12 placed on the pallet 13. Thus, the outriggers 26 allow for a generally universal loading envelope. Conventional hand trucks cannot accomplish such a task.

Figure 1A:
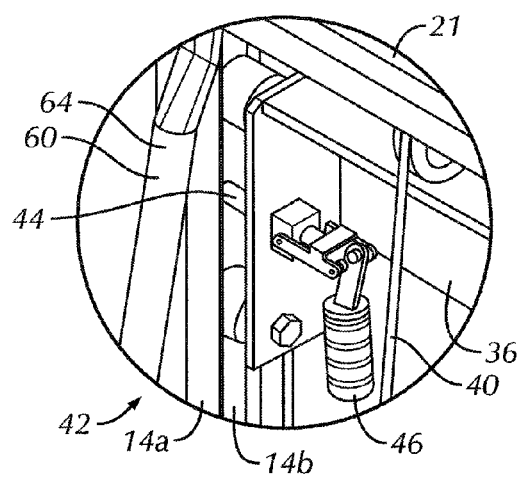
FIG. 1A is an enlarged perspective view of a carriage lock of the adjustable lift truck shown in FIG. 1, taken from within circle "A" of FIG. 1.
Figure 1B:
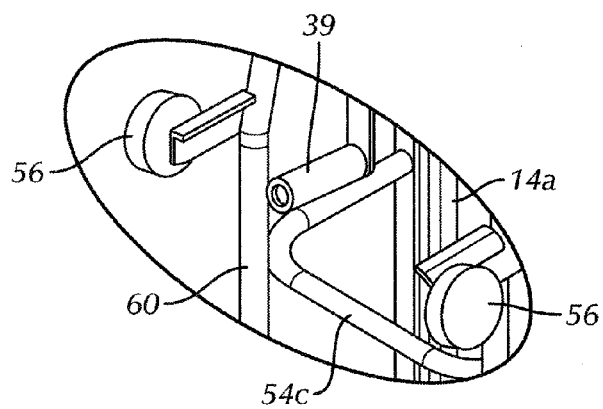
FIG. 1B is an enlarged perspective view of loading wheels of the adjustable lift truck shown in FIG. 1, taken from within circle "B" of FIG. 1.
Figure 1C:
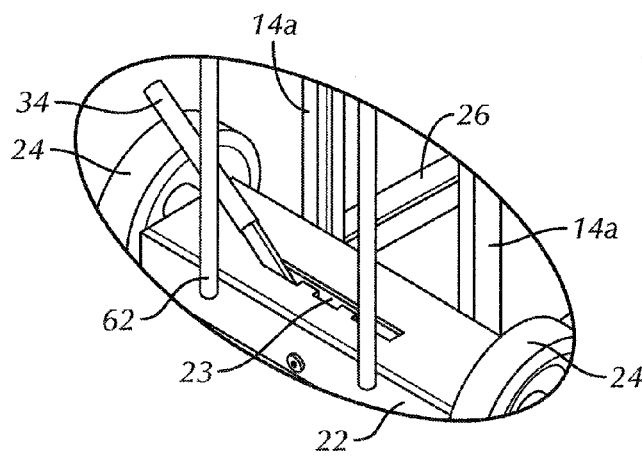
FIG. 1C is an enlarged perspective view of transport wheels of the adjustable lift truck shown in FIG. 1, taken from within circle "C" of FIG. 1.
Figure 2:
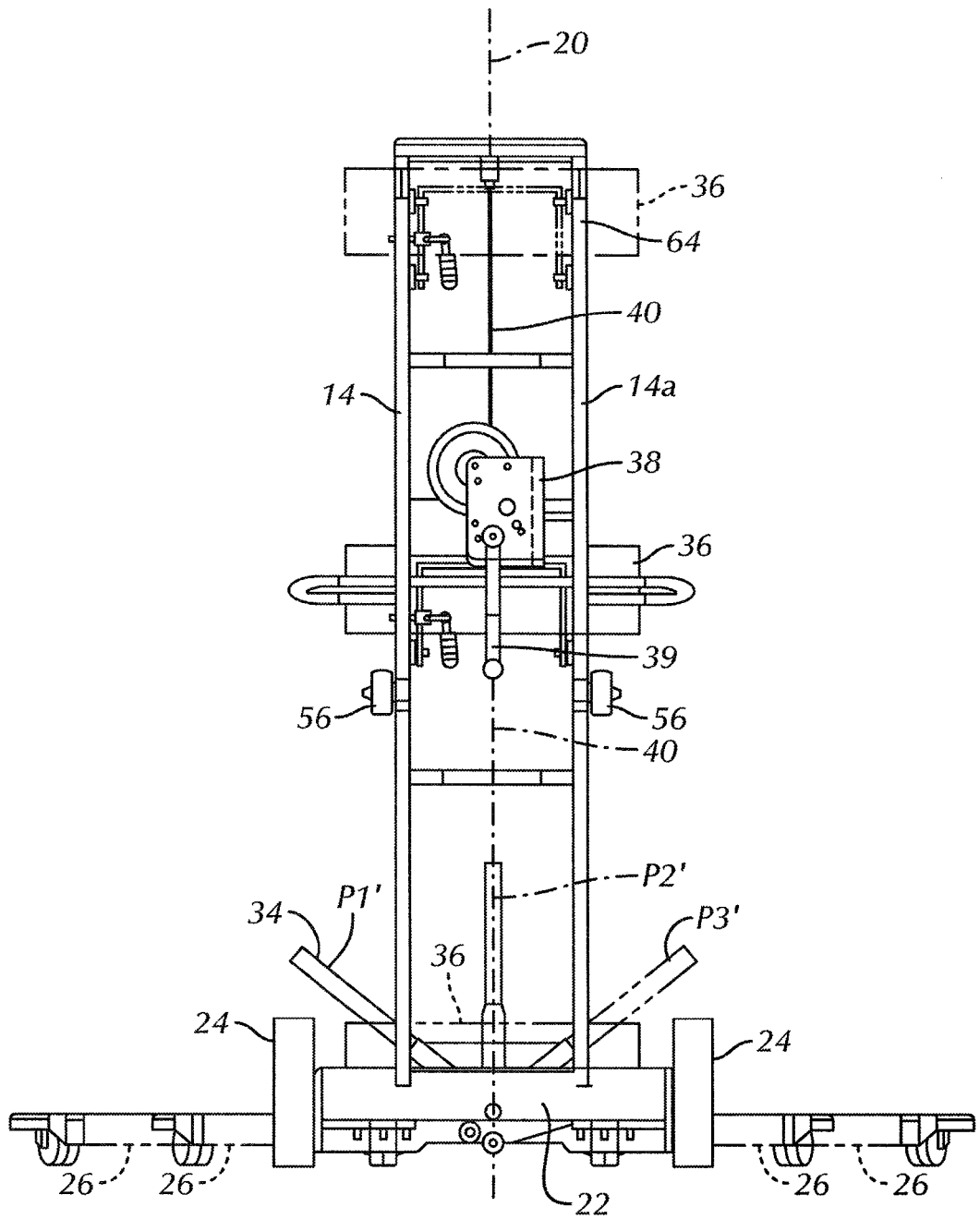
FIG. 2 is a rear elevation view of the adjustable lift truck shown in FIG. 1, wherein outriggers of the lift truck are shown in phantom in various positions and a carriage of the lift truck is shown in phantom in various positions.
Figures 3, 3A:
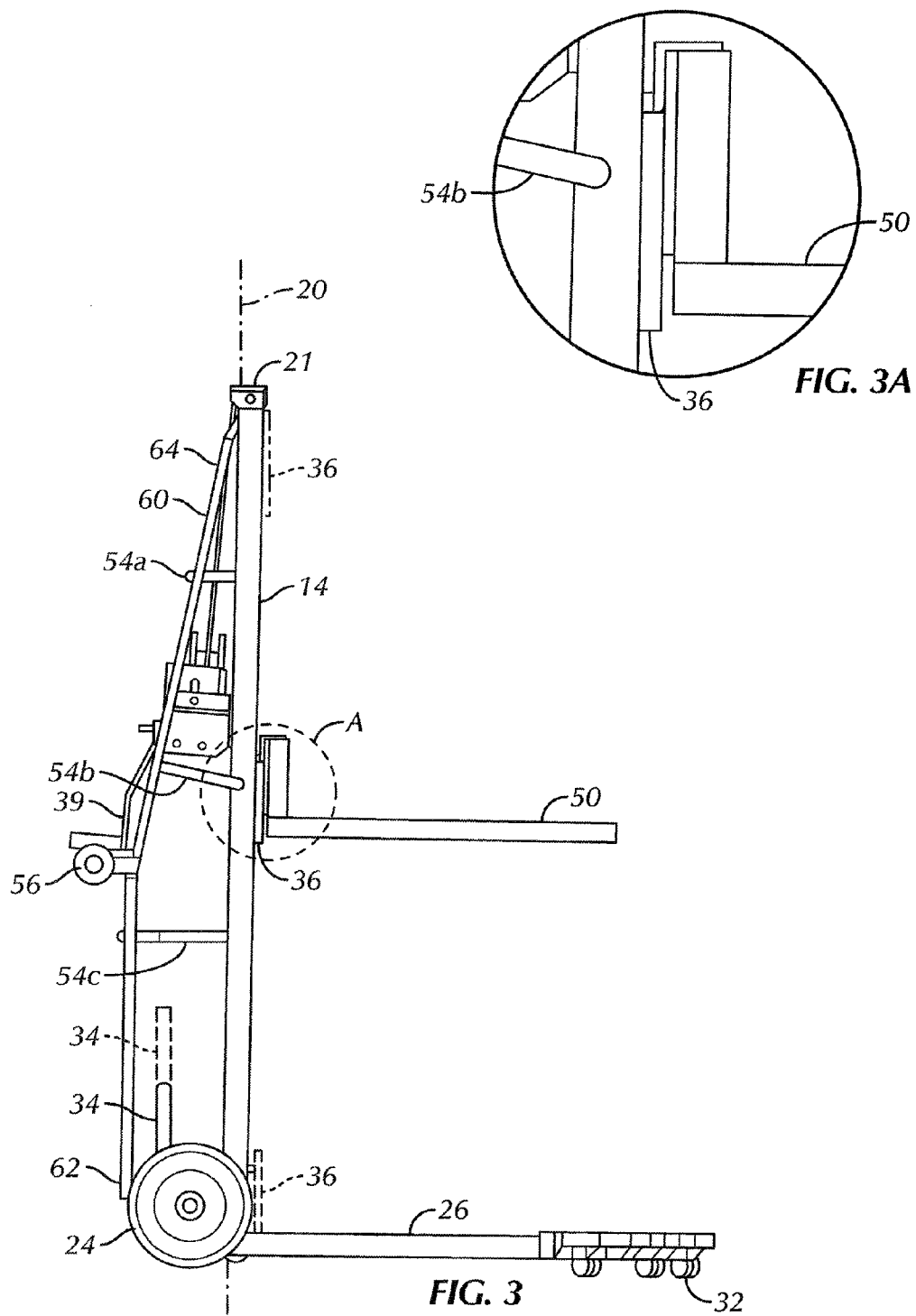
FIG. 3 is a side elevation view of the adjustable lift truck shown in FIG. 1.
FIG. 3A is an enlarged side elevation view of a carriage attachment of the adjustable lift truck shown in FIG. 3, taken from within circle "A" of FIG. 3.
Figure 4:
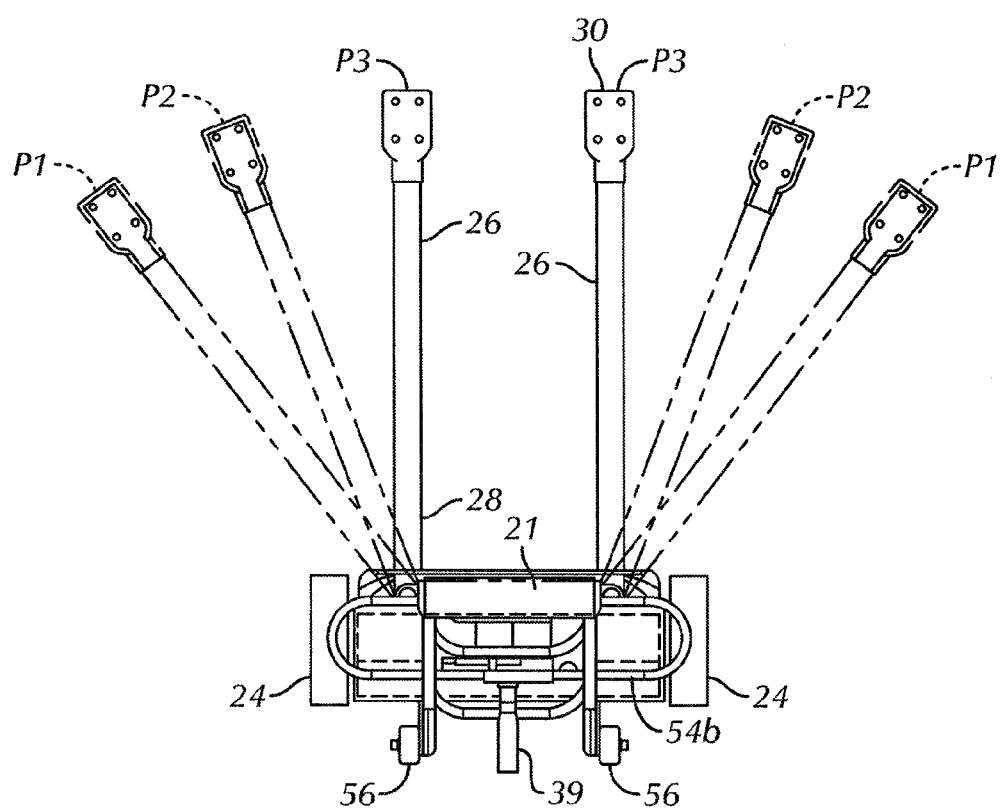
FIG. 4 is a top plan view of the adjustable lift truck shown in FIG. 1, wherein the outriggers are shown in phantom in various positions.
Figure 5:
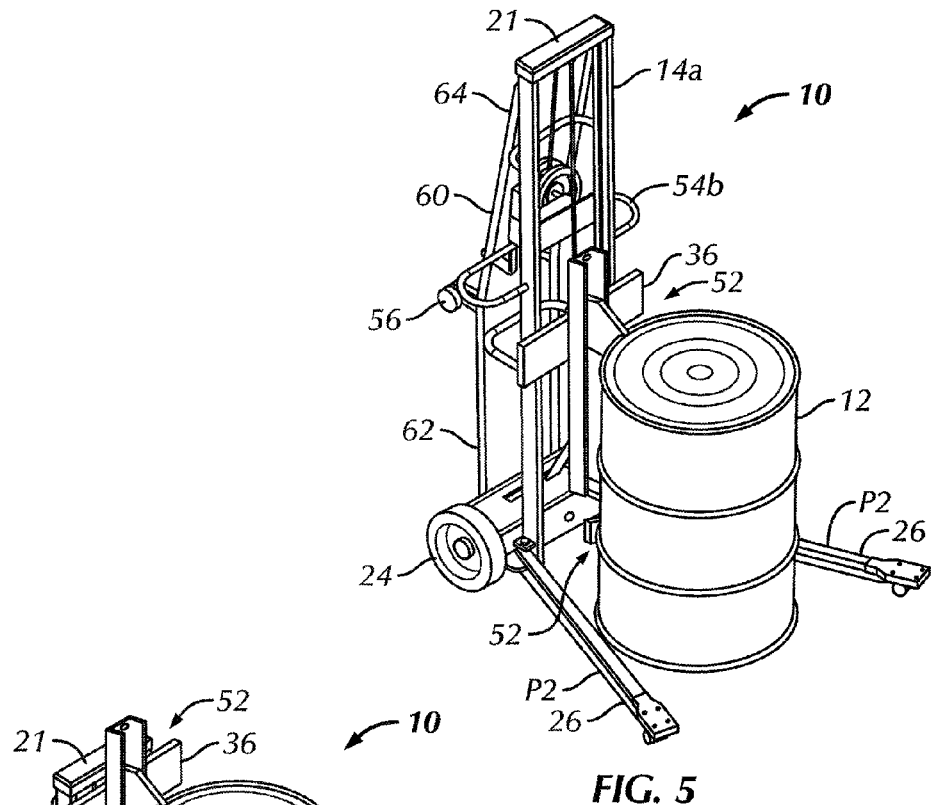
FIG. 5 is a top front perspective view of the adjustable lift truck shown in FIG. 1 attached to a barrel or drum, wherein the barrel is in a first or lower position.
Figure 6:
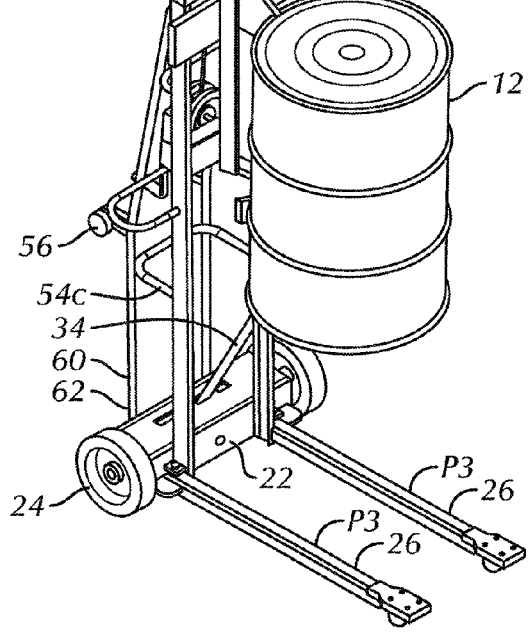
FIG. 6 is a top front perspective view of the adjustable lift truck shown in FIG. 1 attached to the barrel, wherein the barrel is in a second or raised position.
Figure 7:
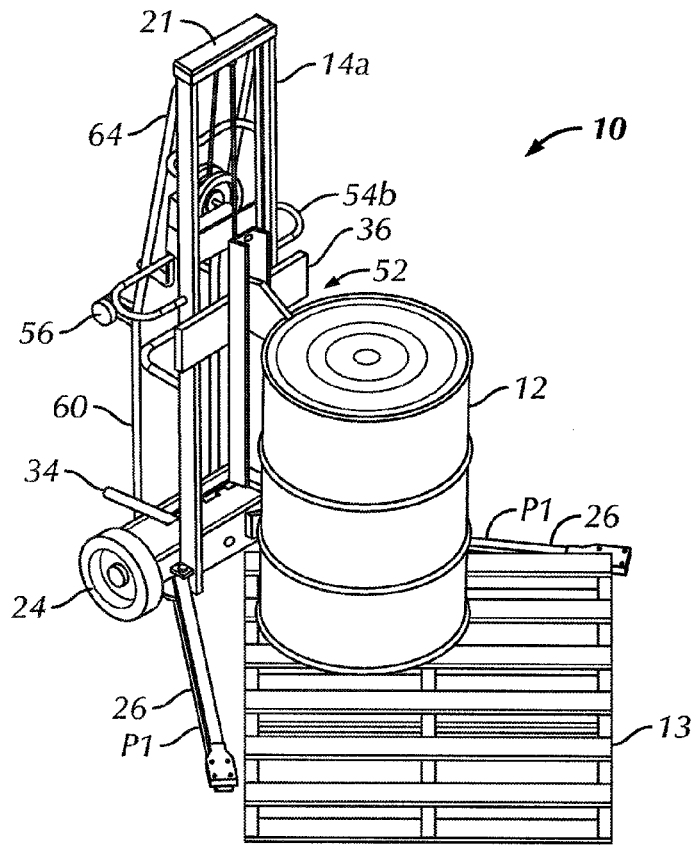
FIG. 7 is a top front perspective view of the adjustable lift truck shown in FIG. 1 attached to a barrel on a pallet, wherein the barrel is in the first or lower position.
Figure 8:
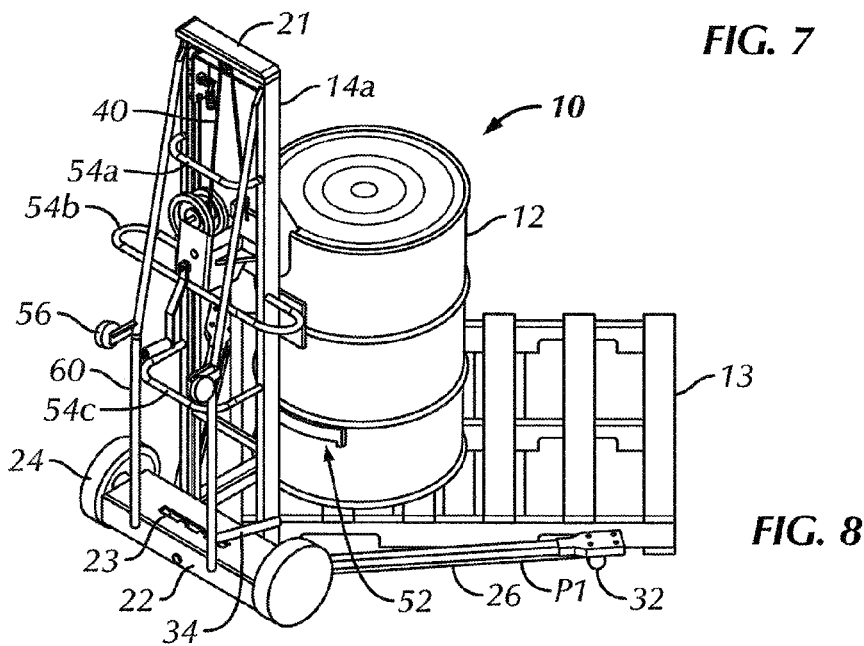
FIG. 8 is a top rear perspective view of the adjustable lift truck shown in FIG. 1 attached to the barrel on the pallet, wherein the barrel is in the first or lower position.
Figure 9:
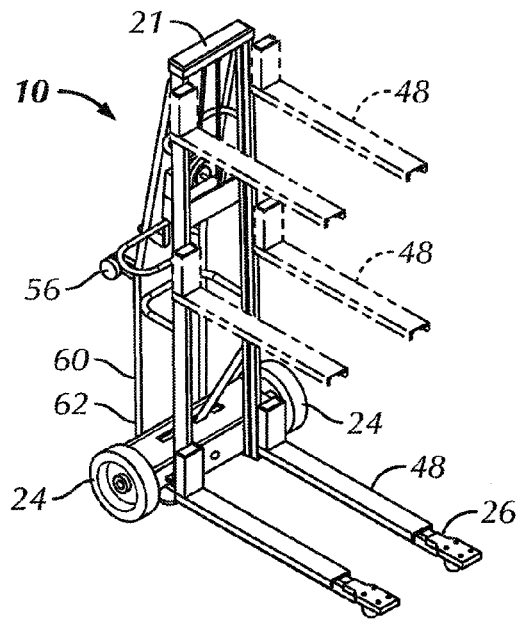
FIG. 9 is a top front perspective view of the adjustable lift truck shown in FIG. 1 attached to a fork attachment which is shown in phantom in various positions.
Figure 10:
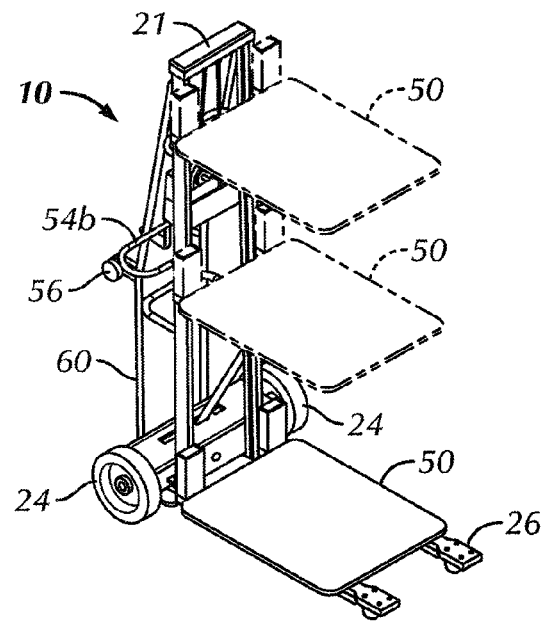
FIG. 10 is a top front perspective view of the adjustable lift truck shown in FIG. 1 attached to a plate attachment, wherein the plate attachment is shown in phantom in various positions.
Figure 11:
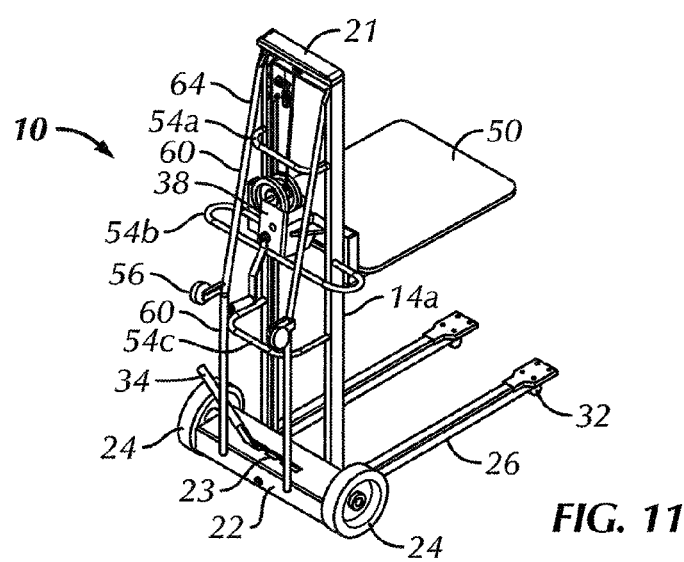
FIG. 11 is a top rear perspective view of the adjustable lift truck shown in FIG. 1 attached to the plate attachment.

Referring to FIGS. 1, 1C and 2, the truck 10 preferably includes an adjustment lever 34 pivotally supported by the base 22 and operatively connected to the pair of outriggers 26. The adjustment lever 34 preferably extends from the cavity of the base 22 through the slot 23 to the external environment. Specifically, the cavity of the base 22 houses a transferring mechanism (not shown), such as a gear train or other mechanical system, therein that operatively connects the adjustment lever 34 to the outriggers 26. The transferring mechanism transfers movement of the adjustment lever 34 into movement of each of the outriggers 26. As shown in FIG. 2, in the preferred embodiment, the adjustment lever 34 is pivotable between a first position P1', a second position P2', and a third position P3' to move the outriggers 26 between the first position P1, the second position P2, and the third position P3, respectively. The adjustment lever 34 is pivotable or adjustable even while the truck 10 is under a full load, such as when the barrel 12 is being raised above the ground surface 58 (see FIG. 6).

Referring to FIGS. 1, 1A and 2, the truck 10 preferably includes a carriage 36 movably mounted to the frame 14. The carriage 36 is designed to raise, lower and/or hold an item, such as the barrel 12, to be moved. As shown in FIGS. 1 and 2, a winch 38 is preferably fixedly attached to the frame 14 and operatively connected to the carriage 36. Specifically, a cable 40 attaches the carriage 36 directly to the winch 38. Operation or rotation of the winch 38 by a winch handle 39 moves the carriage 36 on the frame 14, such that the carriage 36 can be moved from a position proximate the second end 18 of the frame 14 (FIG. 1) to another position proximate the first end 16 of the frame 14 (FIG. 5), or vice versa. Alternatively, the winch 38 may be operated automatically or by remote control, for example. The winch 38 and cable 40 are capable of holding or locking the carriage 36 in any position even when the carriage 36 is directly attached to a heavy item, such as the barrel 12 raised above the ground surface 58.

As shown in FIG. 1A, the truck 10 preferably includes a carriage lock 42 to hold or lock the carriage 36 in any one of a plurality of discrete positions on the frame 14. The carriage lock 42 preferably includes a laterally-extending rod 44 attached to a pivotable carriage lever 46. The rod 44 and carriage lever 46 are preferably movably attached to the carriage 36. Pivoting the carriage lever 46 moves the rod 44 into and out of engagement with at least one of the beams 14a of the frame 14 to either lock the carriage 36 in any one of several discreet positions on the frame 14 or allow movement of the carriage 36 with respect to the frame 14. At least one of the beams 14a may define a channel 14b or a plurality of spaced-apart slots or holes (not shown) to receive at least a portion of the rod 44 therein.

Specifically, pivoting the carriage lever 46 to a downward, generally vertical position (FIG. 1A) preferably moves the rod 44 laterally-inwardly and out of engagement with the frame 14, while pivoting the carriage lever 46 to an upward, generally horizontal position preferably moves the rod 44 laterally-outwardly and into engagement with the frame 14 to lock the carriage 36 in a desired position on the frame 14. The carriage lock 42 prevents the cable 40 from developing slack or becoming loose when transporting the truck 10 in a horizontal position (not shown), such as on a bed of a pick-up truck 68 (FIG. 12) or other vehicle, or in a vertical or substantially vertical position (FIG. 1).

Referring to FIGS. 3, 3A and 5-12, the truck 10 preferably includes one or more lifting attachments 48, 50, 52 that are removeably attached to the carriage 36 for raising, lowering and/or holding one or more different items, such as the barrel 12, on the truck 10. Specifically, the lifting attachments may include a fork attachment 48 (see FIG. 9), a platform attachment 50 (see FIGS. 3, 3A and 10-12), and a drum lifting attachment 52 (see FIGS. 5-8). Once attached to the carriage 36, each one of the attachments 48, 50, 52 directly engages the item(s) to be raised, lowered and/or held. Each attachment 48, 50, 52 is directly attached to the carriage 36 by a secure engagement (not shown), which allows the attachment 48, 50, 52 to be removed when desired, but securely fixes the attachment 48, 50, 52 to the carriage 36 during operation. Specifically, each attachment 48, 50, 52 preferably can be selectively "slipped-on" or "slipped-off" the carriage 36, such that attachment to and/or removal from the carriage 36 does not require any tools, such as a hammer or screwdriver, or attachment hardware, such as bolts or screws. The truck 10 is not limited to the inclusion of the above-identified attachments 48, 50, 52, as the carriage 36 and/or truck 10 may accommodate any one of a variety of other different types of lifting attachments (not shown).

Referring to FIG. 1, the frame 14 of the truck 10 preferably includes at least one and preferably two laterally spaced-apart support shafts 60. A first or lower end 62 of each support shaft 60 is preferably fixedly attached, such as by a weld, to a portion or side of the base 22 that opposes the portion or side of the base 22 from which the outriggers 26 extend. A second or upper end 64 of each support shaft 60 is preferably fixedly attached, such as by a weld, to a portion or side of one of the beams 14a at the second end 18 of the frame 14 and/or to the top brace 21. Each support shaft 60 is preferably at least slightly arcuate or non-linear in shape, such that each support shaft 60 extends outwardly away from the beams 14a and provides structural support or rigidity to the beams 14a. At least one handle 54a, 54b, 54c preferably extends from the beams 14a to the support shafts 60 to provide rigidity to the frame 14 and truck 10 and to provide a point of contact for a user to easily and safely grab the truck 10 to pivot, move and/or hold the truck 10. In the preferred embodiment, the truck 10 includes at least three vertically spaced-apart handles 54a, 54b, 54c, wherein each handle 54a, 54b, 54c has a different size and/or shape.

As shown in FIGS. 1, 1B, 2, 3 and 4-12, a pair of spaced-apart loading rollers or wheels 56 are preferably rotatably attached to a portion of the support shafts 60. Specifically, each loading wheel 56 is rotatably attached to one of the support shafts 60. The loading wheels 56 are preferably rotatably about a single axis that extends generally perpendicularly to the longitudinal axis 20 and generally parallel to the axis that extends through the transport wheels 24, but the loading wheels 56 are not so limited. For example, the loading wheels 56 may be caster-like, such that the loading wheels 56 rotate about a plurality of axes. The loading wheels 56 are positioned on the support shafts 60 at a location that is generally equal to the height of lowered, horizontally-extending tailgate 66 (FIG. 12) of a pick-up truck 68 or other vehicle when the truck 10 is in the upright, stopped or resting position (FIGS. 1 and 12). Due to the placement of the loading wheels 56, when the loading wheels 56 are placed next to the tailgate 66, the truck 10 can be relatively easily placed onto a bed of the pick-up truck 68 or other vehicle by simply pivoting the truck 10 about the loading wheels 56 (see arrow Z in FIG. 12). As a result of this motion, the loading wheels 56 will rest on the top surface of the tailgate 66 and/or the bed of the pick-up truck 68 or other vehicle, such that the truck 10 is placed in a horizontal, stopped or resting position (not shown) in the bed of the pick-up truck 68 or other vehicle. The loading wheels 56 also facilitate movement of the truck 10 on or across the bed of the pick-up truck 68 or other vehicle. Similarly, the loading wheels 56 may facilitate placing the truck 10 on a variety of other structures, such as on a loading bay or dock (not shown).

Those skilled in the art will appreciate that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An adjustable lift truck comprising:
   a frame having a first end and an opposing second end, the frame defining a longitudinal axis extending from the first end to the second end, and comprising two laterally spaced-apart beams, each spaced-apart beam having a lower end portion;
a pair of laterally spaced-apart transport wheels rotatably mounted to the frame proximate the first end thereof; and
a pair of laterally spaced-apart outriggers, extending generally perpendicular to the longitudinal axis of the frame, each outrigger being located proximate the first end of the frame, and each outrigger including a first end, pivotally attached to and angularly pivotable with respect to each lower end portion, and an opposing free second end, including a support wheel on a lower surface thereof.

2. The adjustable lift truck according to claim 1, wherein the pair of outriggers are pivotable between a first position defining a generally ninety degree angle therebetween, a second position defining an angle of less than ninety degrees, and a third position such that the outriggers extend generally parallel to each other.

3. The adjustable lift truck according to claim 2, further comprising:
a base fixedly attached to the first end of the frame, the transport wheels being rotatably attached to the base; and an adjustment lever pivotally supported by the base and operatively connected to each outrigger,
the lever being pivotable to pivot the outriggers between the first, second and third positions, respectively.

4. The adjustable lift truck according to claim 3, wherein the base connects the two-laterally spaced-apart beams at the first end of the frame and a top brace connects the two laterally spaced-apart beams at the second end of the frame.

5. The adjustable lift truck according to claim 4, wherein the frame includes two laterally spaced-apart support shafts, a first end of each support shaft being fixedly attached to a portion of the base and a second end of each support shaft being fixedly attached to a portion of the top brace, and wherein each support shaft is at least slightly non-linear such that each support shaft extends outwardly from the beams and provides structural support to the beams.

6. The adjustable lift truck according to claim 5, wherein at least one handle extends from at least one of the two-laterally spaced-apart beams to at least one of the support shafts to provide structural support to the frame and a point of contact for a user to grab.

7. The adjustable lift truck according to claim 1, further comprising:
a carriage movably mounted to the frame along the longitudinal axis thereof; and
a winch fixedly attached to the frame and operatively connected to the carriage, wherein operation of the winch moves the carriage with respect to the frame.

8. The adjustable lift truck according to claim 7, further comprising:
a carriage lock having a rod attached to a pivotable carriage lever, wherein pivoting the carriage lever moves the rod into and out of engagement with at least a portion of the frame to either lock the carriage in a discrete position or allow movement of the carriage with respect to the frame.

9. The adjustable lift truck according to claim 1, wherein at least two separate lifting attachments are each removably attachable to the carriage for raising or lowering two or more different objects, wherein the lifting attachments are selected from the group consisting of a fork attachment, a platform attachment and a drum lifting attachment.

10. The adjustable lift truck according to claim 1, further comprising:
a handle extending outwardly from the frame; two laterally spaced-apart support shafts; and a pair of loading wheels rotatably attached to a portion of the support shafts.

11. An adjustable lift truck comprising:
a frame having a first end and an opposing second end, the frame defining a longitudinal axis extending from the first end to the second end, and comprising two laterally spaced-apart beams, each spaced-apart beam having a lower end portion;
a pair of laterally spaced-apart outriggers extending generally perpendicular to the longitudinal axis of the frame, each outrigger being located proximate the first end of the frame, and each outrigger including a first end, pivotally attached to and angularly pivotable with respect to each lower end portion;
a pair of laterally spaced-apart transport wheels rotatably mounted to the frame proximate the first end thereof;
a carriage movably mounted to the frame along the longitudinal axis thereof; and
a winch fixedly attached to the frame and operatively connected to the carriage, wherein operation of the winch moves the carriage with respect to the frame.

12. The adjustable lift truck according to claim 11, further comprising:
a lifting attachment removably attachable to the carriage and directly engageable with an object to be lifted.

13. The adjustable lift truck according to claim 11, wherein a cable attaches the carriage directly to the winch.

14. The adjustable lift truck according to claim 13, further comprising:
a carriage lock having a rod attached to a pivotable carriage lever, wherein pivoting the carriage lever moves the rod into and out of engagement with at least a portion of the frame to either lock the carriage in a discrete position or allow movement of the carriage with respect to the frame.

15. An adjustable lift truck comprising:
a frame having a first end and an opposing second end, the frame defining a longitudinal axis extending from the first end to the second end, and comprising two laterally spaced-apart beams, each spaced-apart beam having a lower end portion;
a base fixedly attached to the frame proximate the first end thereof;
a pair of laterally spaced-apart transport wheels rotatably mounted to the base;
a pair of laterally spaced-apart outriggers extending generally perpendicular to the longitudinal axis of the frame, each outrigger being located proximate the first end of the frame, each outrigger including a first end pivotally attached to-each lower end portion, and an opposing free second end, the free second end of each outrigger including a support wheel on a lower surface thereof, the pair of outriggers being angularly pivotable to at least three positions;
an adjustment lever pivotally supported by the base and operatively connected to each outrigger, the adjustment lever being pivotable to pivot the outriggers between the at least three positions, respectively;
a carriage movably mounted to the frame along the longitudinal axis thereof; and
a winch fixedly attached to the frame and operatively connected to the carriage via a cable, wherein operation of the winch moves the carriage with respect to the frame.

\* \* \* \* \*